(12) United States Patent
Genise

(10) Patent No.: US 6,916,270 B2
(45) Date of Patent: Jul. 12, 2005

(54) DRIVELINE TORQUE INTERRUPT SYSTEM

(75) Inventor: Thomas Alan Genise, Dearborn, MI (US)

(73) Assignee: Eaton Corporation, Cleveland, OH (US)

(*) Notice: Subject to any disclaimer, the term of this patent is extended or adjusted under 35 U.S.C. 154(b) by 42 days.

(21) Appl. No.: 10/107,512

(22) Filed: Mar. 27, 2002

(65) Prior Publication Data
US 2003/0186782 A1 Oct. 2, 2003

(51) Int. Cl.⁷ .............................................. F16H 59/68
(52) U.S. Cl. ...................... 477/102; 477/110; 477/906
(58) Field of Search ................................ 477/101, 102, 477/103, 107, 110, 111, 112, 906

(56) References Cited

U.S. PATENT DOCUMENTS

| | | | |
|---|---|---|---|
| 3,626,455 A | * 12/1971 | Toda et al. | 477/102 X |
| 4,393,732 A | * 7/1983 | Suzuki et al. | 477/906 X |
| 4,903,662 A | * 2/1990 | Hirukawa et al. | 477/101 |
| 4,966,115 A | * 10/1990 | Ito et al. | 477/102 |
| 5,021,956 A | * 6/1991 | Yoshimura et al. | 477/102 X |
| 5,072,630 A | * 12/1991 | Kikuchi et al. | 477/101 |
| 5,103,692 A | * 4/1992 | Shimanaka et al. | 477/906 X |
| 5,188,005 A | * 2/1993 | Sankpal et al. | 477/102 |
| 5,403,246 A | * 4/1995 | Umemoto | 477/101 |
| 5,460,581 A | * 10/1995 | Ueda | 477/906 X |
| 5,591,905 A | * 1/1997 | Fujimoto et al. | 73/118.1 |
| 5,855,533 A | * 1/1999 | Tolkacz et al. | 477/110 |
| 5,868,116 A | * 2/1999 | Betts et al. | 123/481 |
| 6,015,365 A | 1/2000 | Kolb et al. | |
| 6,468,183 B1 | * 10/2002 | O'Neil et al. | 477/107 |

FOREIGN PATENT DOCUMENTS

| | | |
|---|---|---|
| DE | 37 30 565 A1 | 3/1988 |
| EP | 0 573 901 A1 | 12/1993 |
| EP | 1 143 173 A3 | 10/2001 |
| EP | 1 143 173 A2 | 10/2001 |
| JP | 401220759 * | 9/1989 ................. 477/906 |

OTHER PUBLICATIONS

Derwent English Abstract for DE 37 30 565 A1.
International Search Report, 3 pages.

* cited by examiner

Primary Examiner—Ha Ho
(74) Attorney, Agent, or Firm—Rader, Fishman & Grauer PLLC

(57) ABSTRACT

A control system and method for controlling a vehicular automated transmission system having an internal combustion engine and a multiple speed transmission, is provided. The control system includes an ignition having an output that issues an ignition signal and a first control unit that operates the engine in response to receipt of the ignition signal. A second control unit receives input signals from various system sensors and process the signals according to logic rules to issue a command output signal. A relay interrupts transmission of the ignition signal to the first control unit in response to either the absence or receipt of the command output signal. The method includes the steps of determining if the automated transmission system is operating abnormally and interrupting transmission of the ignition signal to the first control unit when it is determined the automated transmission system is operating abnormally.

34 Claims, 4 Drawing Sheets

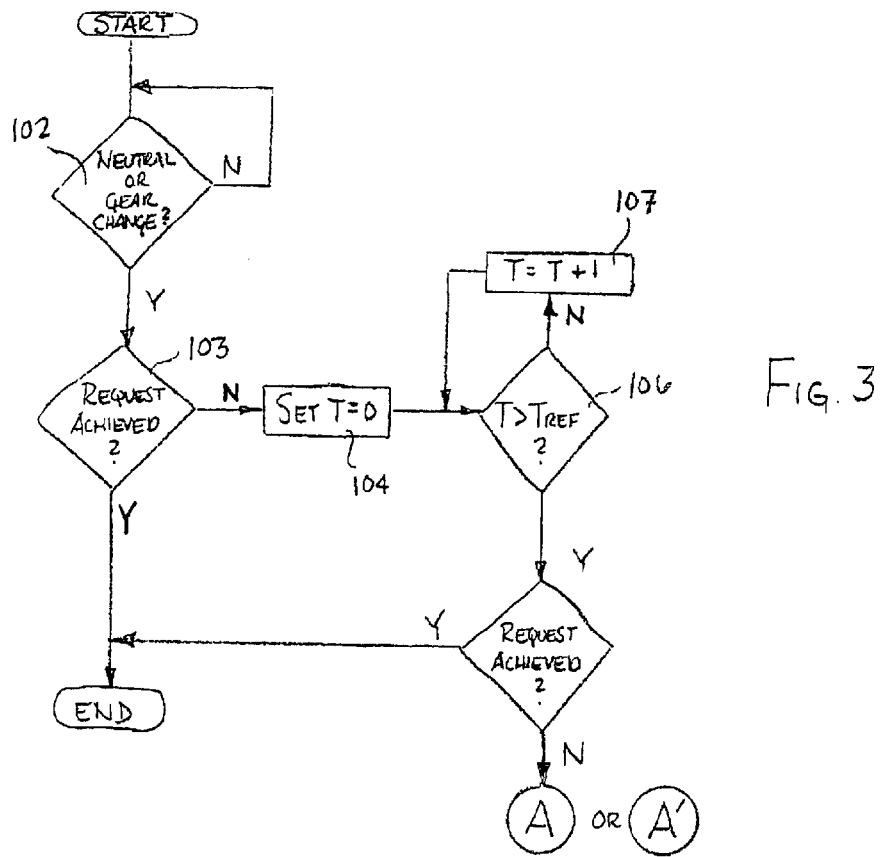
FIG. 3
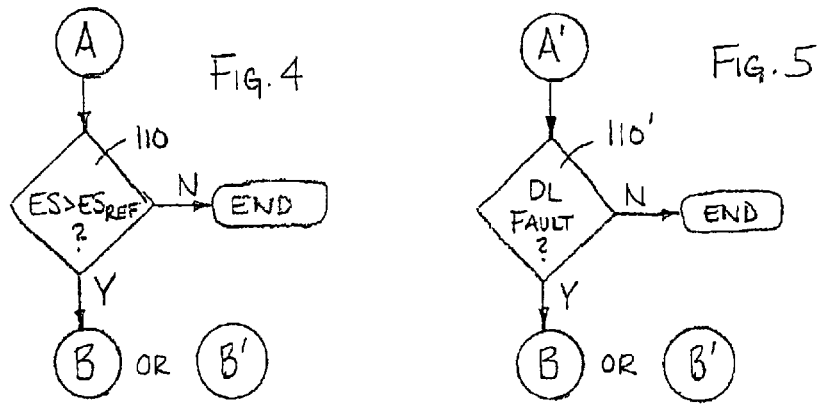
FIG. 4
FIG. 5

DRIVELINE TORQUE INTERRUPT SYSTEM

BACKGROUND OF THE INVENTION

1. Field of the Invention

The present invention relates generally to an automated vehicular transmission system that includes an engine, a multiple ratio transmission, a centrifugally operated master friction clutch for drivingly coupling the engine to the transmission and a control system for controlling engine output torque.

2. Description of the Related Art

Automated mechanical transmission systems not requiring the vehicle driver to operate the vehicle master clutch (so called "two-pedal systems") are known in the art. To reduce the complexity of these systems, it has been known to provide a centrifugally operated friction clutch for drivingly coupling a vehicle engine to the transmission. Centrifugally operated friction clutches typically include weights pivotable or rotatable with respect to an engine driven input member that, upon rotation of an input member, will move radially outwardly under the effect of centrifugal force to cause the input member to frictionally engage an output member.

When the centrifugal master friction clutch is engaged and rotational torque is being transmitted from the vehicle engine to the transmission, there generally is a large torque load or "torque lock" holding the transmission gears in a particular position. This torque load makes it quite difficult, if not impossible, to shift the transmission to neutral or change gears without somehow significantly reducing the torque load.

One way to relieve torque load is to disengage the master clutch, which breaks the coupling between the input member and the output member. Disengaging the master friction clutch permits the torque load to go to zero and allows the operator or transmission system to shift into neutral or change gears. However, disengaging a centrifugally operated clutch requires a substantial reduction in the engine speed. If the engine is generating substantial, uninterrupted power at an engine speed above the engagement speed of the centrifugally operated clutch, it may be difficult or impossible to achieve neutral or shift gears in the transmission. Also, shifting the transmission with the master friction clutch remaining engaged is preferred in many situations, as such shifts tend to be of a higher shift quality and/or cause less wear on the drive-line.

Accordingly, a control system and method of operating a vehicular transmission system is required that breaks torque load between the engine and the transmission when the engine is generating substantial, uninterrupted power.

SUMMARY OF THE INVENTION

A control system and method are provided for controlling a vehicular automated transmission system having an internal combustion engine and a multiple speed transmission. In accordance with a preferred embodiment of the present invention, the control system includes an ignition having an output that issues an ignition signal requesting operation of the engine. The control system also includes a first control unit that operates the engine in response to receipt of the ignition signal. A second control unit receives input signals from various system sensors and processes the signals according to logic rules to issue a command output signal. A relay disposed between the ignition and the first control unit interrupts transmission of the ignition signal to the first control unit in response to either the absence or receipt of the command output signal.

The method of controlling the vehicular automated transmission system includes the steps of first determining if the automated transmission system is operating abnormally and second, interrupting transmission of the ignition signal to the first control unit when it is determined the automated transmission system is operating abnormally.

The inventive control system and method of controlling a vehicular automated transmission system provides a means of momentarily breaking torque load to allow a transmission to achieve neutral or to permit a gear change. Among other advantages, the break in torque load can be achieved independent of the control of fuel delivery to the engine. This and other features of the present invention are particularly advantageous in automated transmission systems that employ a centrifugally operated master friction clutch, which is generally incapable of being disengaged when the engine is generating substantial, uninterrupted power.

Various additional aspects and advantages of this invention will become apparent to those skilled in the art from the following detailed description of the preferred embodiment, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

FIGS. 3, 4 and 6 are schematic illustrations, in flowchart format, of the control logic according to a preferred embodiment of the present invention.

FIGS. 5 and 7 are schematic illustrations, in flowchart format, of the control logic according to an alternate embodiment of the present invention.

DESCRIPTION OF THE PREFERRED EMBODIMENT

Figure 1:
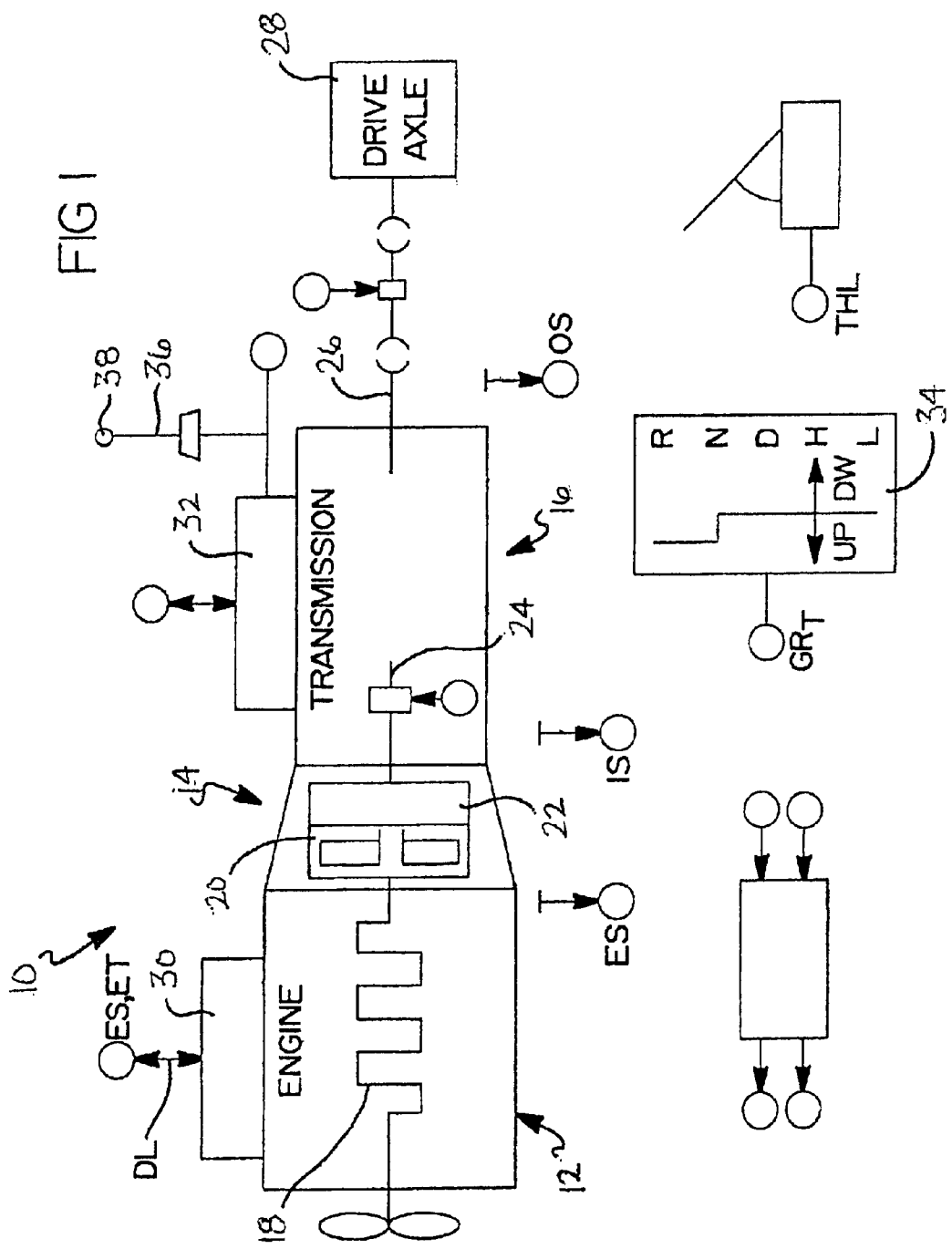
FIG. 1 is a schematic illustration of a vehicular automated transmission system according to the present invention.

Referring now to the drawings, the preferred embodiments of the present invention are described in detail. An exemplary vehicular automated mechanical transmission system 10 advantageously utilizing the control system and method of the present invention is schematically illustrated in FIG. 1. System 10 generally includes a fuel-controlled engine 12, a centrifugal master friction clutch 14 and a multiple-speed mechanical transmission 16. Engine 12 generally includes a crankshaft 18, which is attached to an input member 20 of centrifugal master friction clutch 14. Input member 20 frictionally engages with, and disengages from, an output member 22, which is attached to an input shaft 24 of transmission 16.

Transmission 16 may be of the simple or compound type, having an output shaft 26 that extends from transmission 16 for driving connection to the vehicle drive wheels through a drive axle 28 or transfer case. Transmission 16 may be fully automated, partially automated, or manual with controller assist, all of which are well known in the art.

The terms "engaged" and "disengaged," as used in connection with a master friction clutch, refer to the capacity or lack of capacity, respectively, of the clutch to transfer a significant amount of torque. Mere random contact of the friction surfaces, in the absence of at least a minimal clamping force, is not considered engagement.

As may be seen from FIG. 1, centrifugal clutch 14 requires no external clutch actuator and is operated as a function of the rotational speed of engine 12. Centrifugal clutch 14 also requires no connections to operating linkages, command signal inputs, power electronics and/or fluid power conduits. While the most economical application of the present invention is with a dry friction clutch, the present invention is also compatible with wet clutch technology.

An engine controller 30, which is preferably electronically and microprocessor-controlled, is preferably provided for controlling fuel delivery to engine 12. One or more engine torque or torque limit values may be commanded on, or read from, an industry standard data link (DL), such as an SAE J-1922, SAE J-1939 or ISO11898 compliant data link. By way of example, data links complying with SAE J1939 or comparable protocol, allow engine controller 30 to issue commands over the data link for the engine to be fueled in any one of several modes, such as (i) in accordance with the operator's setting of the throttle, (ii) to achieve a commanded or target engine speed (ES=ES$_T$), (iii) to maintain engine speed and engine torque below limits (ES<ES$_{MAX}$ and ET<ET$_{MAX}$), and most importantly (iv) to achieve a commanded or target engine torque (ET=ET$_T$). Engine torque as used herein refers to a value indicative of an engine torque, usually gross engine torque, from which an output or flywheel torque may be calculated or estimated.

A transmission controller 32, which is also preferably electronically and microprocessor-controlled, is provided to control operation of transmission 16 and is preferably capable of providing output information to various system components. Transmission controller 32 is configured to receive input signals, as will be described below, and process the same according to predetermined logic rules to issue command output signals to system components, such as transmission 16, engine controller 30 and the like.

A shift selector 34 is preferably provided to allow the vehicle driver to select a mode of transmission operation and provides a signal GR$_T$ to transmission 16 indicative thereof. Alternatively, a manually operated shift lever 36 having a shift knob 38 thereon may be provided. As is well known, shift lever 36 is manually manipulated in a known shift pattern for selective engagement and disengagement of various shift ratios. Shift knob 38 may include an intent to shift switch by which a vehicle operator will request automatic engine fueling control to relieve torque lock and allow a shift to transmission neutral or a gear change.

When master friction clutch 14 is engaged and rotational drive is being transmitted from engine 12 to transmission 16, there is a large torque load, or "torque lock," holding the transmission gears in a particular configuration. This torque load makes it quite difficult, if not impossible, to shift transmission 16 to neutral or to change gears without somehow breaking the torque load. Because clutch 14 is centrifugal operated, torque load must be relieved by disengaging clutch 14 or by fueling engine 12 to cause assumed zero drive-line torque and/or by forcing torque reversals, which will positively cause crossings of zero drive-line torque, as is known in the art.

As will be appreciated, during operation of system 10, certain abnormal operating conditions may arise that preclude interruption of torque load to cause assumed zero drive-line torque and/or torque reversals. These operating conditions include, but are not limited to, failure of the data link through which fuel delivery information is transferred from the engine controller, malfunction of the engine fuel delivery system, or any other system malfunction that results in engine 12 operating at a substantial, uninterrupted power.

According to the present invention, a control system and method is provided for controlling system 10 and, more particularly, the torque output of engine 12. The present invention functions to relieve torque load between engine 12 and transmission 16 to facilitate engagement and disengagement of transmission gears in a vehicle transmission.

Figure 2:
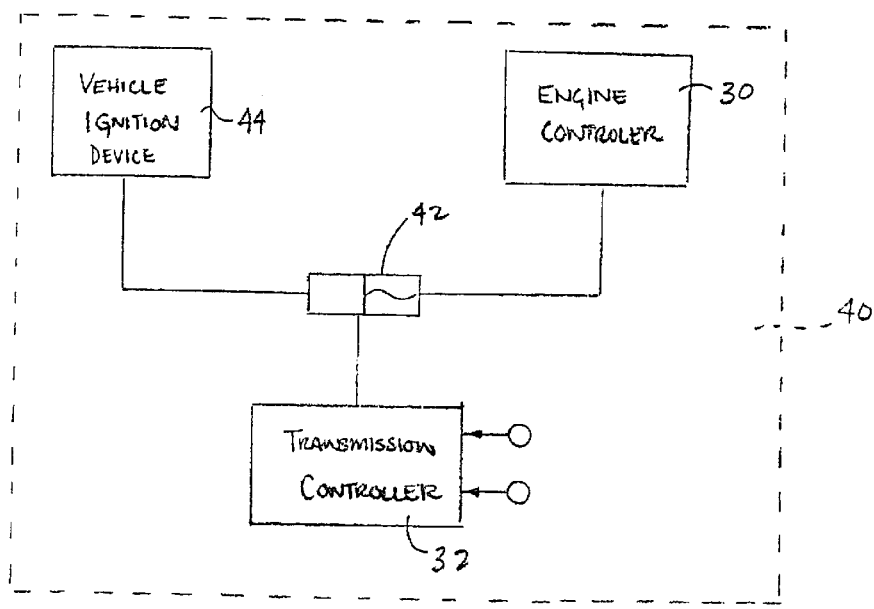
FIG. 2 is a schematic illustration of a preferred embodiment of a control system for breaking torque load in the vehicular automated transmission system of FIG. 1.

Referring to FIG. 2, in a preferred embodiment of the present invention, a control system 40 is provided that includes engine controller 30, transmission controller 32 and a relay 42. The term relay, as used herein, is used to describe any electronic or electromechanical switching device that controls the opening or closing of an electrical path. Relay 42 may be normally closed, wherein the path is normally completed, or normally open, wherein the path is normally incomplete. Relay 42 may be separate from other components in system 40 or may be integrated into the electronics of either engine controller 30 or transmission controller 32. Additionally, relay may be integrated into a composite control unit (not illustrated), which includes the functionality of both engine controller 30 and transmission controller 32.

As shown in the schematic illustration of FIG. 2, relay 42 is preferably disposed electrically between a vehicle ignition device 44 and engine controller 30. Upon authorization, vehicle ignition device 44 provides an ignition signal to engine controller 30 commanding operation of engine 12. Ignition device 44 may include, for example, a conventional key operated ignition switch or other suitable ignition device commonly used to start and operate a motor vehicle.

Relay 42 also communicates with transmission controller 32, as illustrated in FIG. 1. During operation of system 10, transmission controller 32 receives input signals from various system sensors (none illustrated) and processes the signals according to predetermined logic rules to issue a command output signal to relay 42. These input signals are generally indicative of system 10 operating parameters, including, but not limited to, engine speed (ES), engine output torque (ET), transmission output shaft speed (OS) and various other operating conditions, such as the current transmission gear selection.

As described above, certain abnormal operating conditions may arise during operation of system 10 that preclude the normal relief of torque load through controlled fuel delivery to engine 12. Abnormal operation of system 10 is preferably determined by control logic stored in transmission controller 32 in cooperation with the input signals received from the various system sensors. Transmission controller 32 is programmed to break torque load by periodically operating relay 42 so as to interrupt the ignition signal received by engine controller 30 when abnormal operation of system 10 is detected. Interrupting the ignition signal terminates operation of engine 12 causing a sufficient break in torque load that permits engaging and disengaging the transmission gears.

Referring to FIG. 3, a schematic illustration is shown, in flowchart format, of the control logic according to a preferred embodiment of the present invention. Referring to steps 102 and 103, transmission controller 32 first determines whether neutral mode or a gear change has been requested, but not achieved. This step is accomplished, for example, by sensing the position of gear selector 34 and comparing it to actual transmission operation, i.e., is the transmission in neutral or is the torque load suitable for a gear change.

If the requested mode of operation is not achieved, a timer is initialized, step 104, and the control logic pauses for a predetermined time period, i.e., until $T>T_{REF}$, such as approximately three seconds, as shown in steps 106 and 107. This pause allows system 10 ample time to run a conventional "torque break" routine, such as by reducing fuel delivery to engine 12 to break the torque load.

Following this pause, transmission controller 32 re-evaluates the operational status of transmission 16, step 108, to determine if the standard torque interrupt routine allowed transmission 16 to shift to neutral or if the torque load is at a level suitable for a gear change. Referring to FIGS. 4 and 5, transmission controller 32 then proceeds to determine whether system 10 is operating abnormally, warranting interruption of the ignition signal. As illustrated in the FIGS. 3–7, transition from one figure to another is labeled with a letter, such as "A" and "B," which denotes the transition from one schematic illustration to the next.

Referring to FIG. 4, as shown in step 110, transmission controller 32 compares the engine speed (ES) to a threshold value or values ($ES_{REF}$), such as the engine idle speed, and determines operation of system 10 to be abnormal when the engine speed exceeds the threshold, i.e., $ES>ES_{REF}$. Referring to FIG. 5, in an alternate embodiment, transmission controller 32 evaluates the functional status of the data link over which commands are issued for engine fueling, as shown in step 110'. A functional fault in the data link may be interpreted to indicate uncontrolled fueling of engine 12, warranting a determination that operation of system 10 is abnormal.

While the preferred system operating parameter and condition useful in determining abnormal operation of system 10 are described above, the described parameter and condition are not intended to be limited thereto. Alternatively, other criteria may be evaluated in determining whether operation of system 10 is abnormal. For example, transmission controller 32 can be programmed to determine whether system 10, more particularly transmission 14, is operating in a "fallback" mode, as is known in the art. Operating transmission 16 in a "fallback" mode is generally indicative of uncontrolled operation of engine 12, particularly in engines whose operation is not commanded over a data link. Alternatively, transmission controller 32 can be programmed to evaluate any combination of system operating parameters. For example, the engine speed (ES), the functional status of the data link and whether transmission 16 is operating in a "fallback" mode may all be evaluated to determine whether operation of system 10 is abnormal.

Figure 6:
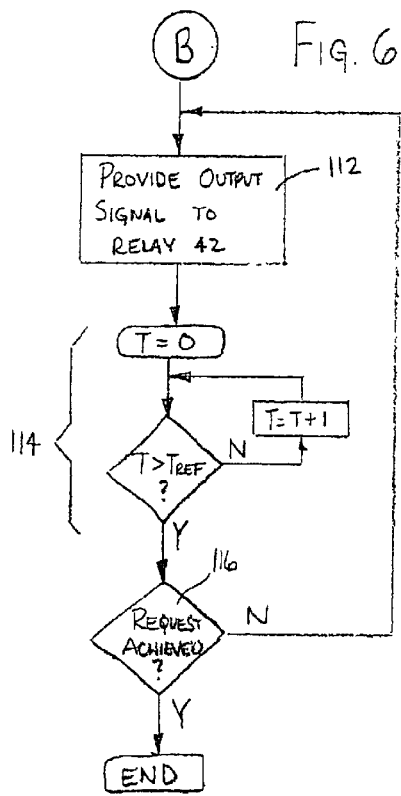

Referring to FIG. 6, when a normally closed relay is employed in control system 40, transmission controller 32 will issue a command output signal (step 112) causing relay 42 to open, upon a determination that operation of system 10 is abnormal. The command output signal is preferably issued only momentarily, such as, for example, approximately one second or less, allowing relay 42 to briefly interrupt the ignition signal. Referring to step 114, transmission controller 32 then pauses a predetermined amount of time, e.g., $T_{REF}$ equal to approximately two to three seconds, to await compliance with the requested transmission operating mode. The cycle of issuing a command output signal to relay 42 is repeated, as required, until the torque load has been relieved to a point were the transmission can be shifted to neutral or the transmission gears can be changed, as shown in step 116.

Figure 7:
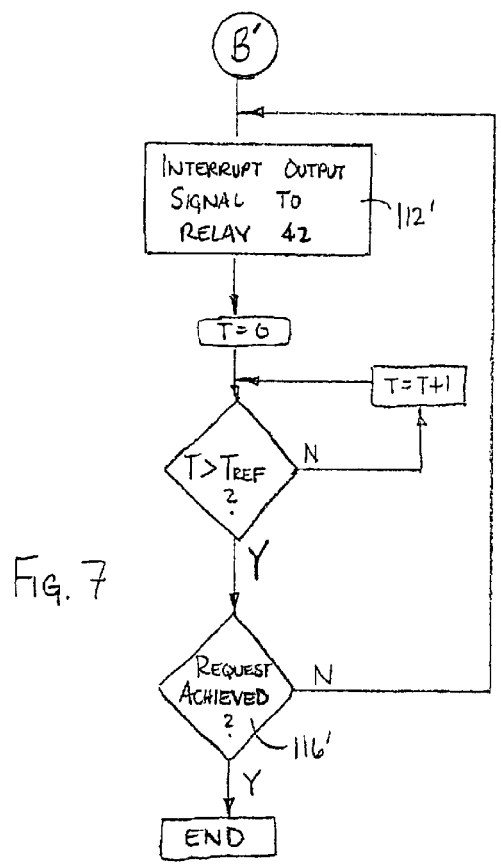

Referring to FIG. 7, a schematic illustration is shown, in flowchart format, of the control logic according to an alternate embodiment of the present invention. In this embodiment, the control logic is programmed to function with a normally open relay, as opposed to the normally closed relay described above. Transmission controller 32 is configured to continuously provide a command output signal to relay 42 during normal operation of system 10. Referring to step 112', when operation of system 10 is determined to be abnormal, transmission controller 32 interrupts transmission of the command output signal to relay 42. The command output signal is preferably interrupted only momentarily, e.g., $T_{REF}$ equal to approximately one second or less, allowing relay 42 to interrupt the ignition signal for a similar period of time. The cycle of interrupting the command output signal to relay 42 is repeated, as required, until the torque load has been relieved to a point were the transmission can be shifted to neutral or the transmission gears can be changed, as shown in step 116'.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A method for controlling a vehicular automated transmission system that includes a torque generating output device, a control unit for operating the output device in response to receipt of an ignition signal and a multiple speed transmission, the method comprising the steps of:
    (a) determining if the automated transmission system is operating abnormally; and
    (b) reducing output torque by interrupting transmission of the ignition signal to the control unit when the automated transmission system is operating abnormally.

2. The method of claim 1, further including the step of determining if a transmission neutral mode or a gear change has been selected but not achieved prior to determining if the automated transmission system is operating abnormally.

3. The method of claim 1, wherein the step of determining if the automated transmission system is operating abnormally is further defined by sensing at least one automated transmission system operating parameter and comparing the operating parameter to a predetermined reference.

4. The method of claim 3, wherein the step of determining if the transmission system is operating abnormally is further defined by sensing an operating speed of the output device and determining operation of the automated transmission system to be abnormal when the sensed operating speed exceeds a predetermined reference speed.

5. The method of claim 1, wherein the step of determining if the automated transmission system is operating abnormally is further defined by evaluating the fault status of a data link and determining operation of the automated transmission system to be abnormal when a data link fault exists.

6. The method of claim 1, wherein the step of determining if the automated transmission system is operating abnormally is further defined by sensing if output device control is available and determining operation of the automated transmission system to be abnormal when output device control is unavailable.

7. The method of claim 6, wherein the step of sensing if output device control is unavailable comprises sensing if the transmission is in a fallback mode.

8. The method of claim 1, wherein the torque generating output device is a fuel controlled internal combustion engine, and wherein the step of determining if the automated transmission system is operating abnormally is further defined by determining if the engine is not responding to a command to reduce fueling.

9. A method for providing a torque break in a vehicular automated transmission system that allows a vehicle transmission to achieve neutral or change gears, comprising the steps of:
  (a) providing an engine and an engine controller for operating the engine in response to receipt of an ignition signal;
  (b) determining if the automated transmission system is operating abnormally; and
  (c) reducing engine output torque by interrupting transmission of the ignition signal to the engine controller when the transmission system is operating abnormally.

10. The method of claim 9, further including the step of determining if a transmission neutral mode or a gear change has been selected but not achieved prior to determining if the automated transmission system is operating abnormally.

11. The method of claim 10, further including the step of pausing a predetermined period of time after the first determining step.

12. The method of claim 9, wherein the step of determining if the automated transmission system is operating abnormally is further defined by sensing at least one automated transmission system operating parameter and comparing the operating parameter to a predetermined reference.

13. The method of claim 9, wherein the step of determining if the transmission system is operating abnormally is further defined by sensing engine speed and determining operation of the automated transmission system to be abnormal when the sensed engine speed exceeds a predetermined reference engine speed.

14. The method of claim 9, wherein the step of determining if the automated transmission system is operating abnormally is further defined by evaluating the fault status of an engine data link and determining operation of the automated transmission system to be abnormal when a data link fault exists.

15. The method of claim 9, wherein the step of determining if the automated transmission system is operating abnormally is further defined by sensing if engine control is available and determining operation of the automated transmission system to be abnormal when engine control is unavailable.

16. The method of claim 15, wherein the step of sensing if engine control is available comprises sensing if the transmission is in a fallback mode.

17. The method of claim 15, wherein the step of sensing if engine control is available comprises sensing if the engine is not responding to a command to reduce fueling.

18. A control system for providing a torque break in a vehicular automated transmission system that allows a vehicle transmission to achieve neutral or change gears, comprising:
  an ignition having an output that issues an ignition signal;
  a first control unit configured to receive input signals and process the signals according to logic rules to issue a command output signal;
  a second control unit that operates the engine in response to receipt of the ignition signal; and
  a relay configured to interrupt transmission of the ignition signal between the ignition and the second control unit in response to either the absence or receipt of the command output signal.

19. The control system of claim 18, wherein the relay is a normally closed relay.

20. The control system of claim 19, wherein the relay interrupts transmission of the ignition signal in response to receipt of the command output signal.

21. The control system of claim 18, wherein the relay is a normally open relay.

22. The control system of claim 21, wherein the relay interrupts transmission of the ignition signal in response to the absence of the command output signal.

23. The control system of claim 18, wherein a composite control unit comprises the functionality of both the first and second control units.

24. The control system of claim 18, wherein the first control unit is a transmission controller and the second control unit is an engine controller.

25. The control system of claim 18, wherein the logic rules are effective for:
  (a) determining if the automated transmission system is operating abnormally; and
  (b) issuing the command output signal when the automated transmission system is operating abnormally.

26. The control system of claim 18, wherein the logic rules are effective for:
  (a) determining if the automated transmission system is operating abnormally; and
  (b) interrupting issuance of the command output signal when the automated transmission system is operating abnormally.

27. A control system for providing a torque break in a vehicular automated transmission system that allows a vehicle transmission to achieve neutral or change gears, comprising:
  an ignition having an output that issues an ignition signal;
  a first control unit configured to receive input signals and process the signals according to logic rules to issue a command output signal, the logic rules effective for determining if the automated transmission system is operating abnormally and interrupting or issuing the command output signal when the automated transmission system is operating abnormally;
  a second control unit that operates the engine in response to receipt of the ignition signal; and
  one of a normally open and a normally closed relay configured to interrupt transmission of the ignition signal between the ignition and the second control unit in response to either the absence or receipt of the command output signal.

28. A method for controlling a vehicular automated transmission system that includes a fuel controlled internal combustion engine, a control unit for operating the engine in response to receipt of an ignition signal, a multiple speed transmission, and a centrifugal master clutch drivingly connecting an output member of the engine with an input member of the transmission at a first engine speed, the method reducing an engine output torque transmitted by the master clutch to enable shifting of the transmission by reducing the engine speed below the first engine speed and comprising the steps of:
  (a) determining if the engine is not responding to a command to reduce fueling to reduce the engine speed; and
  (b) interrupting receipt of the ignition signal by the control unit to reduce the engine speed when it is determined that the command to reduce fueling is not being responded to.

29. The method of claim 28, further including the step of determining if a transmission neutral mode or a gear change has been selected but not achieved prior to determining if the engine is not responding to the command to reduce fueling.

30. The method of claim 28, wherein the step of determining if the engine is not responding to the command to reduce fueling is further defined by sensing at least one automated transmission system operating parameter and comparing the operating parameter to a predetermined reference.

31. The method of claim 30, wherein the step of determining if the engine is not responding to the command to reduce fueling is further defined by sensing an operating speed of the engine and determining that the engine is not responding to the command to reduce fueling when the sensed engine operating speed exceeds a predetermined reference speed.

32. The method of claim 28, wherein the step of determining if the automated transmission system is not responding to the command to reduce fueling is further defined by evaluating the fault status of a data link and determining that the engine is not responding to the command to reduce fueling when a data link fault exists.

33. The method of claim 28, wherein the step of determining if the automated transmission system is not responding to the command to reduce fueling is further defined by sensing if engine control is available and determining operation of the automated transmission system to be abnormal when engine control is unavailable.

34. The method of claim 33, wherein the step of sensing if engine control is unavailable comprises sensing if the transmission is in a fallback mode.

* * * * *